Figure 1:
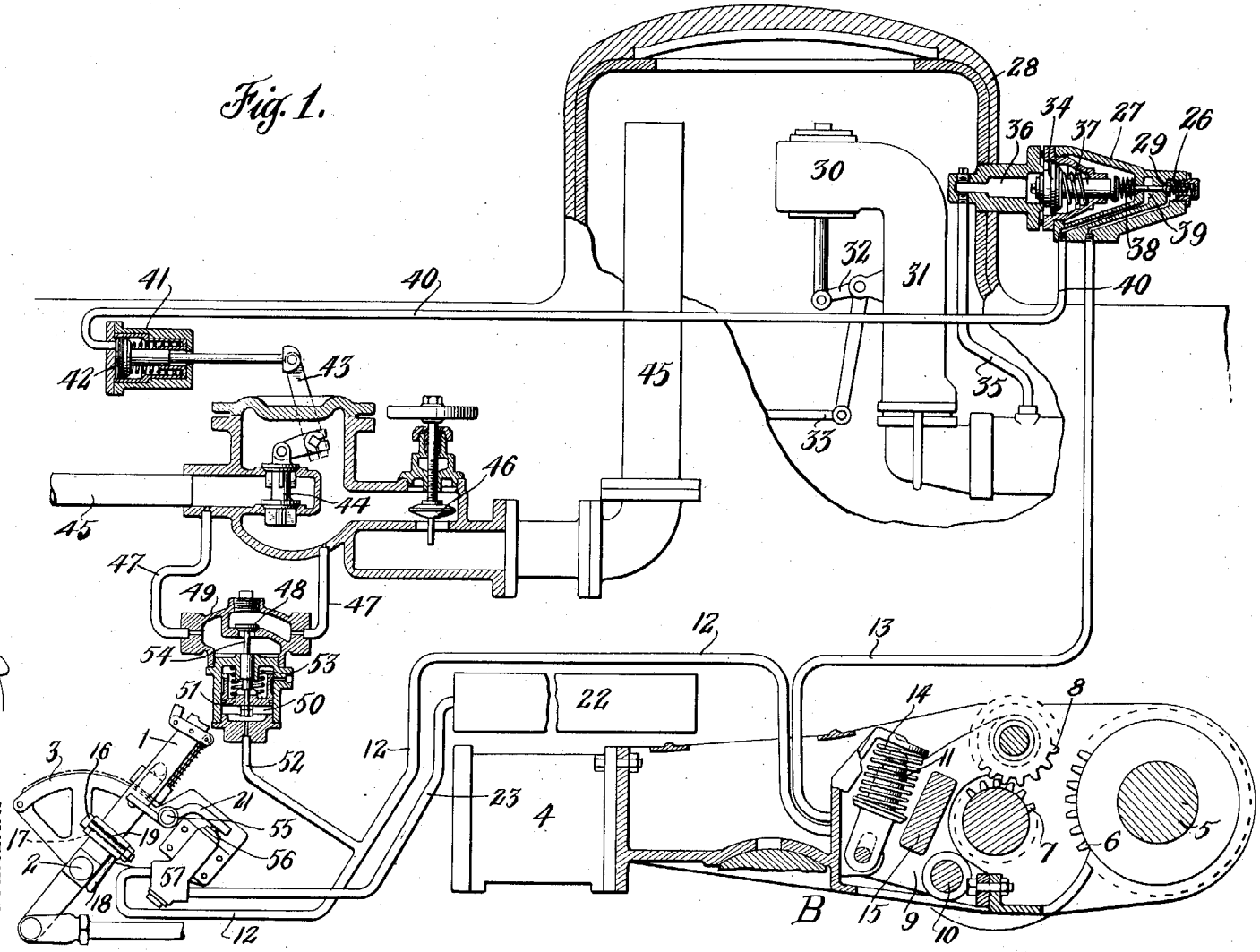

Nov. 23, 1926. Re. 16,483

F. R. PETERS

LOCOMOTIVE BOOSTER MOTOR CONTROLLING MECHANISM

Original Filed Oct. 2, 1922 2 Sheets-Sheet 1

WITNESS
Gustav Genzlinger

INVENTOR
Frank R. Peters
BY Symmestedt & Lechner
ATTORNEYS

Nov. 23, 1926. Re. 16,483
F. R. PETERS
LOCOMOTIVE BOOSTER MOTOR CONTROLLING MECHANISM
Original Filed Oct. 2, 1922 2 Sheets-Sheet 2
Fig. 4.
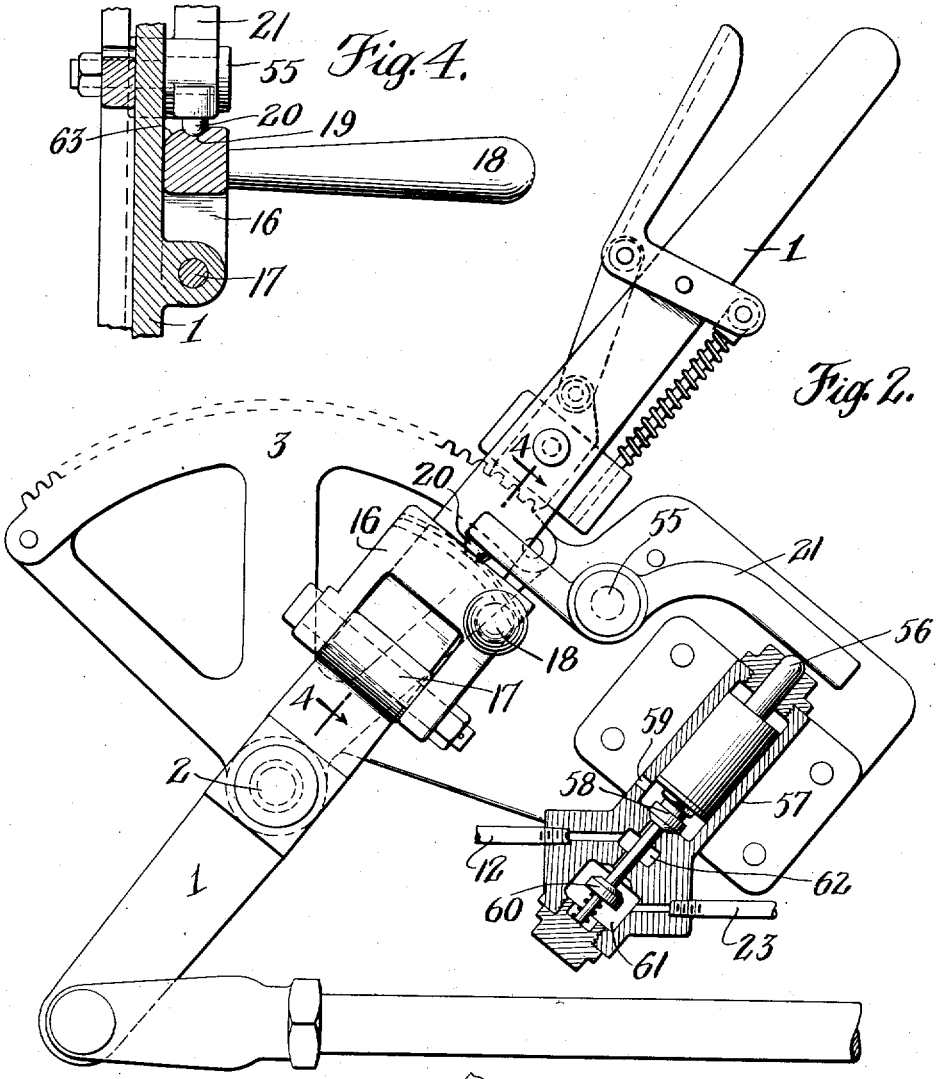
Fig. 2.
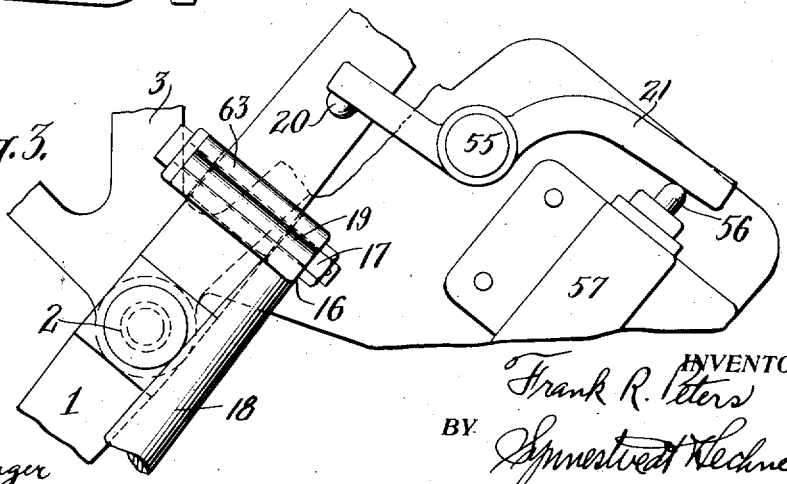
Fig. 3.
WITNESS
Gustav Genzlinger
INVENTOR
Frank R. Peters
BY
Ernest Hechner
ATTORNEYS Reissued Nov. 23, 1926.

Re. 16,483

UNITED STATES PATENT OFFICE.

FRANK RICHARD PETERS, OF NEW YORK, N. Y., ASSIGNOR TO FRANKLIN RAILWAY SUPPLY COMPANY, A CORPORATION OF DELAWARE.

LOCOMOTIVE BOOSTER MOTOR-CONTROLLING MECHANISM.

Original No. 1,470,761, dated October 16, 1923, Serial No. 591,687, filed October 2, 1922. Application for reissue filed May 1, 1924. Serial No. 710,461.

This invention relates in general to locomotive booster motors of the type which has been disclosed in patent to Howard L. Ingersoll No. 1,339,395, issued May 11th, 1920, and it has particular reference to the provision of a novel and improved controlling mechanism for such a booster motor.

Booster motors of the type herein illustrated as is now well known in the art are intended to assist the main locomotive in starting and at slow speeds but they are not intended to drive the locomotive by themselves nor are they intended to be operated at high speeds. It is preferred to have them drive the wheels of a trailer truck although for the purposes of the present invention this is not at all necessary. For a thorough description of the control and operation of a booster motor of this character reference can be made to the above mentioned patent the statement above being simply a brief analysis such as will enable those skilled in the art to understand the invention herein.

The principal object of the present invention resides in the provision of a controlling mechanism for a booster motor which will permit motive power to be supplied to the booster motor in relatively small quantities during the time that "entrainment" (i. e., operating connection of the booster to the locomotive) is taking place. It should be stated, although it is no doubt understood by those skilled in this art, that the booster motor is normally disentrained from the locomotive because during the greater percentage of normal average running it is not intended that the additional propelling power of the booster motor should be made use of. More specifically stated therefore the object of my invention is to ensure positive and easy entrainment of the booster motor without the clashing of any gears which may be employed so that no damage will result to the booster motor and its associated parts when the full operating pressure of the steam is admitted to the booster cylinders. Correlatively, I also aim to prevent application of full power to the booster motor until after its entrainment, so as to obviate the risk of injury to the gears through premature application of full power.

The foregoing together with such other objects as are incident to my invention or may hereinafter appear I obtain by means of a booster motor equipment which is illustrated in preferred form in the accompanying drawings, wherein:

Fig. 1 is a diagrammatic layout illustrating my improved controlling mechanism for locomotive booster motors in its inoperative condition. It should be understood that the parts are not arranged in their actual physical relationship but are immediately associated for the purpose of clearly illustrating their functions; Fig. 2 is an enlarged elevation of the reverse lever and the booster controlling parts associated therewith with one of the valve structures in section, the illustration showing the parts in operative positions; Fig. 3 is a partial view similar to that of Fig. 2 but showing the booster latch in inoperative position; and Fig. 4 is a section on the line 4—4 of Fig. 2.

Referring to the drawings it will be seen that I have partially illustrated the reverse lever 1 of a locomotive. This lever is pivoted at 2 to swing across the quadrant 3 in the manner well understood in the locomotive art. The diagrammatic illustration of the locomotive booster motor B shows the booster cylinders 4 and the axle 5 which they are intended to drive through the medium of the gear 6, pinion 7 and idler gear 8. The latter is mounted upon a rocking member 9 which is adapted to swing upon the pin 10 under the influence of an operating cylinder 11 to throw the idler gear into mesh with the gear 6, it being understood of course that the idler gear remains at all times in mesh with the pinion 7. Fluid pressure, preferably air, is supplied to the cylinder 11 through the pipe 12 and is conducted therefrom through the pipe 13 as will appear hereinafter. The booster motor is said to be "entrained" when the cylinder 11 is operated to throw the idler gear 8 into mesh with the gear 6. Disentrainment is accomplished by exhausting the fluid pressure from the cylinder 11 whereupon the spring 14 assisted by the counterweight 15 functions to return the rocking member 9 to the position illustrated in the drawing.

I prefer to arrange the controlling mechanism for the booster motor so that, before it is thrown into operation, it is necessary for the reverse lever to be moved to a certain predetermined locality on the quadrant. This locality includes the extreme corner position, as it is colloquially expressed, as well as a number of positions just short of the corner. In Figure 1 the reverse lever is shown in one of these positions.

Before proceeding further it is desired to describe the parts associated with the reverse lever. What is known as the booster latch 16 is pivoted to the reverse lever at 17 so that by means of the handle 18 it can be manually moved up into its operative position indicated in Figures 2 and 4 or down into its inoperative position illustrated in Figs. 1 and 3. When in its operative position the groove or channel 19 engages the protuberance 20 at the left end of a lever 21 pivoted at 55 provided, of course, that the reverse lever 1 has been moved far enough into the corner to bring the latch 16 into a position in which it can cooperate with lever 21 to perform its proper function. From inspection of Fig. 2 particularly it will be seen that the groove 19 is of a length sufficient to permit of its engagement with protuberance 20 in a number of positions of the reverse lever short of the actual corner. When the booster latch is in operative position it moves the lever 21 on the pivot 55 to depress the plunger 56 of the reverse lever pilot valve 57 thereby seating valve 58 (see Fig. 2) and closing off exhaust to the atmosphere through port 59. At the same time valve 60 is opened which immediately establishes communication between the air reservoir 22 and the pipe 12 through the medium of the pipe 23 and chambers 61 and 62 in the reverse lever pilot valve 57. The cylinder 11 is then actuated to move the idler gear 8 into mesh with the gear 6 as already described.

The upper face of the latch 16 adjacent the groove 19 is downwardly curved or bevelled at 63 (see Fig. 4) so as to facilitate engagement of the protuberance 20 at times when the latch is thrown up into operative position after the reverse lever has been moved into the corner or near the corner. The engineer can, therefore, place the booster latch in condition to operate before the reverse lever is moved so that it will perform its function just as soon as the forward end of groove 19 engages protuberance 20 or he can wait until after the reverse lever has been moved before throwing up the booster latch 16.

After the cylinder 11 has been moved to accomplish the foregoing the air pressure is established in pipe 13 which communicates with the chamber 26 at the right hand end of the throttle pilot and control valve 27 which is preferably secured to the side of the steam dome 28 of the locomotive. Here further progress of the air pressure is blocked by means of the valve 29.

Within the dome 28 I have illustrated the main locomotive throttle 30 at the beginning of the dry pipe 31. The main throttle 30 is controlled by means of the bell crank lever 32 and the rod 33 leading to the cab, not shown herein. After the reverse lever has been thrown into the corner and the main throttle 30 has been opened in the manner well understood in locomotive practice, the pressure of the live steam within the dry pipe 31 will be communicated to the left hand end of the piston 34 through the pipe 35 and chamber 36 whereupon the piston 34 will be moved to the right against the pressure of the spring 37 and 38 to unseat the valve 29. Air pressure will now flow from the pipe 13 and chamber 26 to the chamber 39 and pipe 40, the latter leading to the left hand end of what is called the booster throttle operating cylinder 41. The piston 42 in this cylinder will then be moved to the right to rock the bell crank lever 43, lift the booster throttle 44 and admit full steam pressure from the dome through the booster dry pipe 45. The cylinders 4 of the booster motor will then operate to aid in the propulsion of the locomotive. The booster dry pipe 45 is provided with a hand wheel operated cut-off valve 46 so that the supply of steam to the booster motor may be shut off by hand should it be desired to do so.

Prior to the time, however, that the booster throttle 44 is opened to admit full operating steam pressure to the booster cylinders 4 and during entrainment, it is my purpose to admit steam to the cylinders 4 in relatively small quantities. This I accomplish in the following manner.

A by-pass pipe 47 is introduced into the booster dry pipe 45 around the booster throttle 44. Flow of steam through this by-pass 47 is controlled by means of a valve 48 within a housing or chamber 49. This valve is normally closed when the booster is not in operation but is automatically opened when pressure from the pipe 12 is introduced into the chamber 50 below the piston 51 through pipe connection 52. Such pressure will move the piston 51 upwardly against the force exerted by the compression spring 53 in order to move the stem 54 upon which the valve 48 in mounted. By virtue of the fact that the pressure which opens the valve 48 comes directly from pipe 12 it can be seen upon examination of Figure 1 that the booster will be supplied with steam in relatively small quantities through the by-pass 47 during the time that entrainment is taking place and prior to the time that the booster throttle 44 is actuated to admit full operating steam pressure to the booster cylinders. In this way I am enabled to ensure easy and positive meshing of the idler gear 8 with the gear 6 since the pistons in the cylinders 4 will be reciprocated slowly to slowly revolve the driving pinion 7.

In this way is secured the additional advantage incident to the arrangement by reason of the fact that the cylinders of the booster motor will be "warmed up" so to speak and cleared of all condensation prior to the time that they are called upon to do their full duty in aiding to propel the locomotive.

It should be understood that the arrangement disclosed contemplates that the booster can be thrown into operation either before the main locomotive begins to operate or during reasonably slow operation thereof and that in either event the booster will be supplied with steam first in relatively small quantities, during entrainment, and then in increased quantities up to full operating pressure. This is made possible by the construction of the latch 16 as above described, etc. On the other hand, the booster cannot be supplied with steam in full amounts until after the booster has been entrained and the main locomotive throttle 30 opened, owing to the interposition of the cylinder 11 and the valve 29 in the connections 12, 13, 40 through which pressure is supplied to open the booster throttle 44.

I claim:

1. In combination with the main driving means of a locomotive, a booster motor for said locomotive and controlling means for the booster motor which, when actuated, automatically supplies the booster motor with the motive power first in relatively small quantities irrespective of whether or not the main driving means of the locomotive has begun to function and thereafter in increased quantities after the main driving means has begun to function.

2. In combination with the main driving means of a locomotive and its reverse lever and throttle valve, a steam actuated booster motor normally disentrained from the locomotive and having a throttle valve and controlling mechanism for the booster motor which can be brought into operation when the reverse lever is put into certain predetermined positions, said controlling mechanism acting to entrain the booster motor with the locomotive and supply it with steam first in relatively small quantities and then to open the booster motor throttle to supply it with steam in larger quantities after the locomotive throttle has been opened.

3. In combination with the main driving means of a locomotive and its reverse lever, a steam actuated booster motor normally disentrained from the locomotive and having a throttle valve, a by-pass around the booster motor throttle, and controlling mechanism for the booster motor which can be brought into operation when the reverse lever is put into certain predetermined positions, said controlling mechanism acting to entrain the booster motor with the locomotive and supply it with steam through said by-pass and then to open the booster motor throttle.

4. A controlling mechanism for a booster supplemented locomotive comprising in combination a booster throttle, a by-pass around said throttle, a fluid actuated valve controlling said by-pass, and mechanism for supplying said valve with operating fluid to open the by-pass prior to the time that the booster throttle is opened.

5. A locomotive booster motor controlling mechanism comprising in combination, booster entraining mechanism, a booster throttle, a comparatively small capacity by-pass around said throttle, means for opening said by-pass during booster entrainment, and means for opening said throttle after the locomotive has begun to operate.

6. In combination with the main driving means of a locomotive including its reverse lever and throttle valve, a steam actuated booster motor normally disentrained from the locomotive and having a throttle valve, booster entraining mechanism, a normally inoperative booster latch on the reverse lever which can be manually placed in condition to function, a comparatively small capacity by-pass around the booster throttle, automatic means for opening said by-pass during booster entrainment, and means for opening the booster throttle after the locomotive throttle has been opened.

7. In booster motor controlling mechanism the combination of a reverse lever, a booster latch pivoted thereon, a fluid pressure pilot valve for the controlling mechanism adapted to be opened by said latch, a pivoted operating lever interposed between the latch and the valve, a protuberance on the lever, a groove on the latch into which the protuberance is adapted to fit, and an inclined guiding face on the latch adapted to permit the latch to be raised into position to engage the protuberance.

8. Locomotive booster motor controlling mechanism comprising, in combination, booster entraining mechanism, a booster throttle, means for admitting steam in small quantities to the booster motor during entrainment, and means for preventing opening of the booster throttle till after entrainment.

9. Locomotive booster motor controlling mechanism comprising, in combination, mechanism for entraining the booster with the locomotive, means for supplying full motive power to the booster motor after its entrainment, and for preventing earlier supply of full power thereto, means for preventing full supply of power to the booster motor in the absence of power supply to the locomotive, and means for supplying power to the booster motor in small amounts during entrainment, irrespective of the supply to the locomotive.

10. Controlling mechanism for a normally disentrained locomotive booster motor including in combination with a booster cylinder, a shiftable gear for entraining the booster, an actuating mean for said gear, and means for admitting steam to the booster motor during an entrainment operation.

11. Locomotive booster motor controlling mechanism including in combination, booster entraining mechanism and means for admitting steam to the booster motor in relatively small quantities during entrainment.

12. A locomotive booster motor controlling system including in combination, a driven gear, a driving gear, a movable idler gear adapted to mesh with the driven gear and with the driving gear and to deliver the power from the latter to the former, means for moving said idler gear into full meshing position as aforesaid, and means for rotating the driving gear during the meshing operation whereby to insure positive and easy entrainment of the said gears.

13. A locomotive booster motor controlling mechanism comprising in combination, booster entraining mechanism, a booster throttle, a comparatively small capacity by-pass around said throttle, and means for opening said by-pass during booster entrainment.

14. A locomotive booster motor controlling mechanism comprising in combination, booster entraining mechanism, connections for supplying full operating pressure of steam to said booster motor, other connections of lesser capacity for supplying steam to said booster motor independently of said first connections, and means for causing a flow of steam thru the connections of lesser capacity during booster entrainment.

15. A locomotive booster motor controlling mechanism including in combination, a driven gear, a driving gear, a movable idler gear adapted to mesh with the driven gear and with the driving gear and to deliver the power from the latter to the former, means for moving said idler gear into full meshing position as aforesaid, connections for supplying full operating pressure of steam to said booster motor, other connections of lesser capacity for supplying steam to said booster motor independently of said first connections, and means for causa flow of steam thru the connections of lesser capacity during booster entrainment.

16. Controlling mechanism for a normally disentrained locomotive booster motor including in combination with a booster cylinder, a booster entraining mechanism having an actuating means, and means for admitting steam to the booster cylinder during an entrainment operation.

17. The combination of a locomotive, a booster motor entraining mechanism for said motor, means for actuating the entraining mechanism, and means for causing operation of the booster when said actuating means is performing an entraining operation.

In testimony whereof, I have hereunto signed my name.

FRANK R. PETERS.